United States Patent [19]
Woo

[11] Patent Number: 5,347,499
[45] Date of Patent: Sep. 13, 1994

[54] CIRCUIT FOR SELECTIVELY SETTING A MONAURAL PLAYBACK CHANNEL IN A STEREO AUDIO APPARATUS

[75] Inventor: Tae-jin Woo, Incheon, Rep. of Korea

[73] Assignee: Samsung Electronics Co., Ltd., Kyungki-Do, Rep. of Korea

[21] Appl. No.: 21,684

[22] Filed: Feb. 24, 1993

[30] Foreign Application Priority Data

Feb. 27, 1992 [KR] Rep. of Korea .................. 92-3112

[51] Int. Cl.$^5$ .............................................. H04B 1/20
[52] U.S. Cl. ......................................... 369/4; 369/5; 369/86; 381/11
[58] Field of Search ................... 369/2, 32, 86, 87, 88, 369/89, 91, 3, 4, 5; 381/11, 1, 2, 28; 360/32

[56] References Cited

U.S. PATENT DOCUMENTS 5,177,728  1/1993  Otsubo et al. .................... 369/48

FOREIGN PATENT DOCUMENTS 2195810  4/1988  United Kingdom .................. 369/86

Primary Examiner—Robert J. Pascal
Assistant Examiner—Arnold Kinkead
Attorney, Agent, or Firm—Sughrue, Mion, Zinn, Macpeak & Seas

[57] ABSTRACT

A circuit selectively sets a left/right monaural playback channel in a digitally signal-processed stereo audio apparatus. The circuit includes a channel selecting signal generator for generating a channel selecting signal to select the channel corresponding to a signal desired to be reproduced among the audio signals of several channels, a storage circuit synchronous to a predetermined clock signal and temporarily storing the audio signals of several channels, a path controlling circuit for controlling the paths of an audio signal supplied after being processed into a digital signal and a signal output from the storage circuit to transmit to a D/A converter the signals corresponding to the channels selectively set by the channel selecting signal generator, and a control circuit for outputting to the channel selecting signal generator the control signal for selecting a desired channel to be reproduced in response to user commands, and controlling the generation of a channel selecting signal.

13 Claims, 2 Drawing Sheets

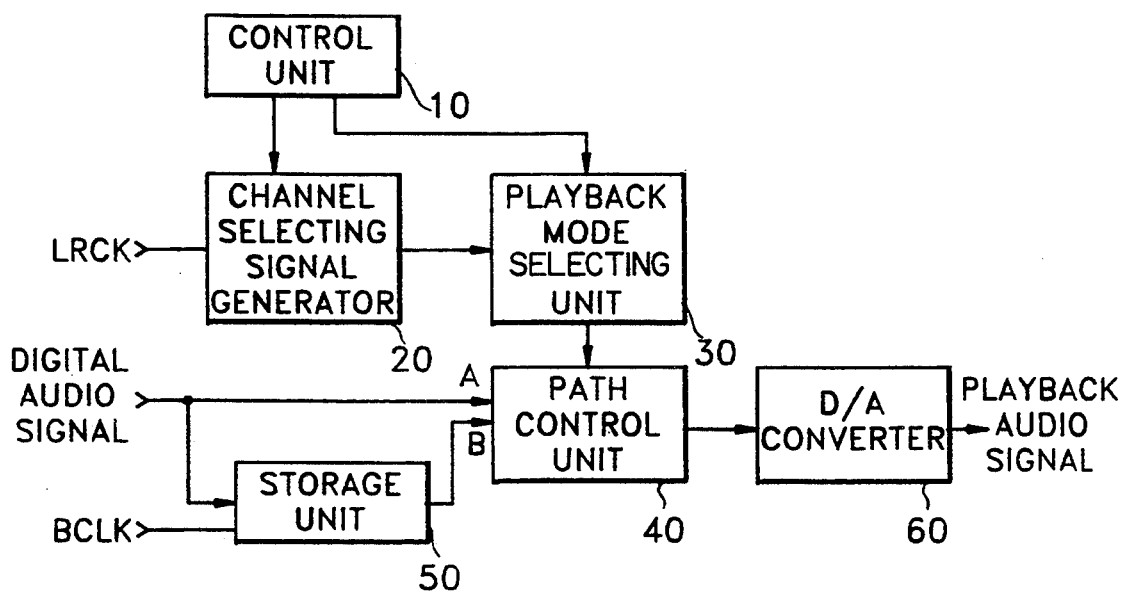
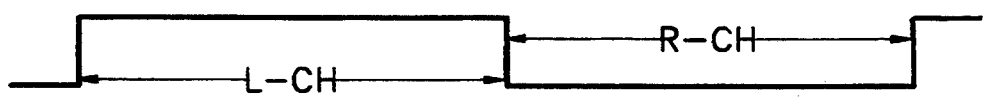
FIG. 2A
FIG. 2B
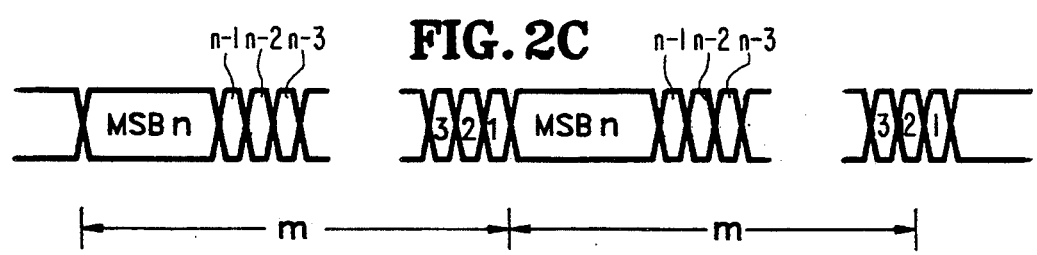
FIG. 2C

CIRCUIT FOR SELECTIVELY SETTING A MONAURAL PLAYBACK CHANNEL IN A STEREO AUDIO APPARATUS

BACKGROUND OF THE INVENTION

The present invention relates to a circuit for selectively setting a monaural playback channel in a stereo audio apparatus of a digital video/audio signal processing system, and more particularly to a circuit for selectively setting a monaural playback channel which selectively sets a single channel signal desired to be reproduced among left/right channel signals to a monaural playback channel after being digitally processed and before conversion into an analog signal.

The present disclosure is based on the disclosure in Korean Patent Application No. 92-3112 filed on Feb. 27, 1992, which disclosure is incorporated herein by reference.

Generally, an audio apparatus in a digital video/audio signal processing system carries out digital-signal processing and analog-signal processing to record/reproduce audio signals. Such an audio apparatus is classified into two types: monaural (generally referred to as "mono") which reproduces the sound utilizing only one channel, and stereophonic (generally referred to as "stereo") which reproduces the sound using a transmission line having at least two channels to achieve a more lifelike sound quality. Recently, the stereo type is generally used, but most systems have a means to select stereo or mono modes according to user preference.

A conventional digital audio apparatus comprises a switching unit constituted by analog elements and formed between a D/A converter and an output unit (including an output amplifier and a speaker), and controls the signal processing according to monaural or stereo type. That is, in the stereo mode, the apparatus controls the operation of an analog switching unit to separately output left/right channel signals via the output unit, which are output from the D/A signal converter. While, in the mono mode, the apparatus controls the operation of the analog switching unit to output the signal of one channel among left/right channel signals to the output unit, respectively. However, due to the structural characteristics of an analog switching unit, the signal of one channel is affected by that of the other channel, and vice versa, so that the quality of the reproduced sound is lowered, which is more severe in the mono mode. Also, since the output from the D/A converter is unamplified, the signal is more sensitive to noise.

SUMMARY OF THE INVENTION

The object of the present invention is to provide a circuit for selectively setting a monaural playback channel in a digitally signal-processed stereo audio apparatus, which selectively sets a single channel signal desired to be reproduced among left/right channel signals to a monaural playback channel after being digitally processed and before conversion into an analog signal.

To achieve the above object of the present invention, there is provided a circuit for selectively setting a monaural playback channel in a stereo audio apparatus in which the audio signals of a plurality of channels reproduced from recording media are digitally processed and converted into analog signals via the D/A converter for output, the circuit comprising:

a channel selecting signal generator for generating a channel selecting signal to select the channel corresponding to a signal desired to be reproduced among the audio signals of the plurality of channels;

storage means for temporarily storing the audio signals of the plurality of channels, the storage means being synchronous to a predetermined clock signal;

path control means for controlling the paths of an audio signal supplied after being digitally processed and a signal output from the storage means to transmit to the D/A converter the audio signals corresponding to the channels selectively set by the channel selecting signal generator; and control means for outputting to the channel selecting signal generator the control signal which can select a desired channel to be reproduced in response to user commands, and controlling the generation of the channel selecting signal.

BRIEF DESCRIPTION OF THE DRAWINGS

Further features and advantages of the present invention will become more apparent from the following and more particular description of the preferred embodiment of the invention as illustrated in the accompanying drawings in which the same reference characters generally refer to like parts throughout the views, and in which:

FIG. 1 is a block diagram of a circuit for selectively setting a monaural playback channel according to the present invention;

FIGS. 2A, 2B and 2C are timing diagrams showing the relationship between data stored in a storage unit and clock signals used in FIG. 1.

DETAILED DESCRIPTION OF THE INVENTION

Figure 3:
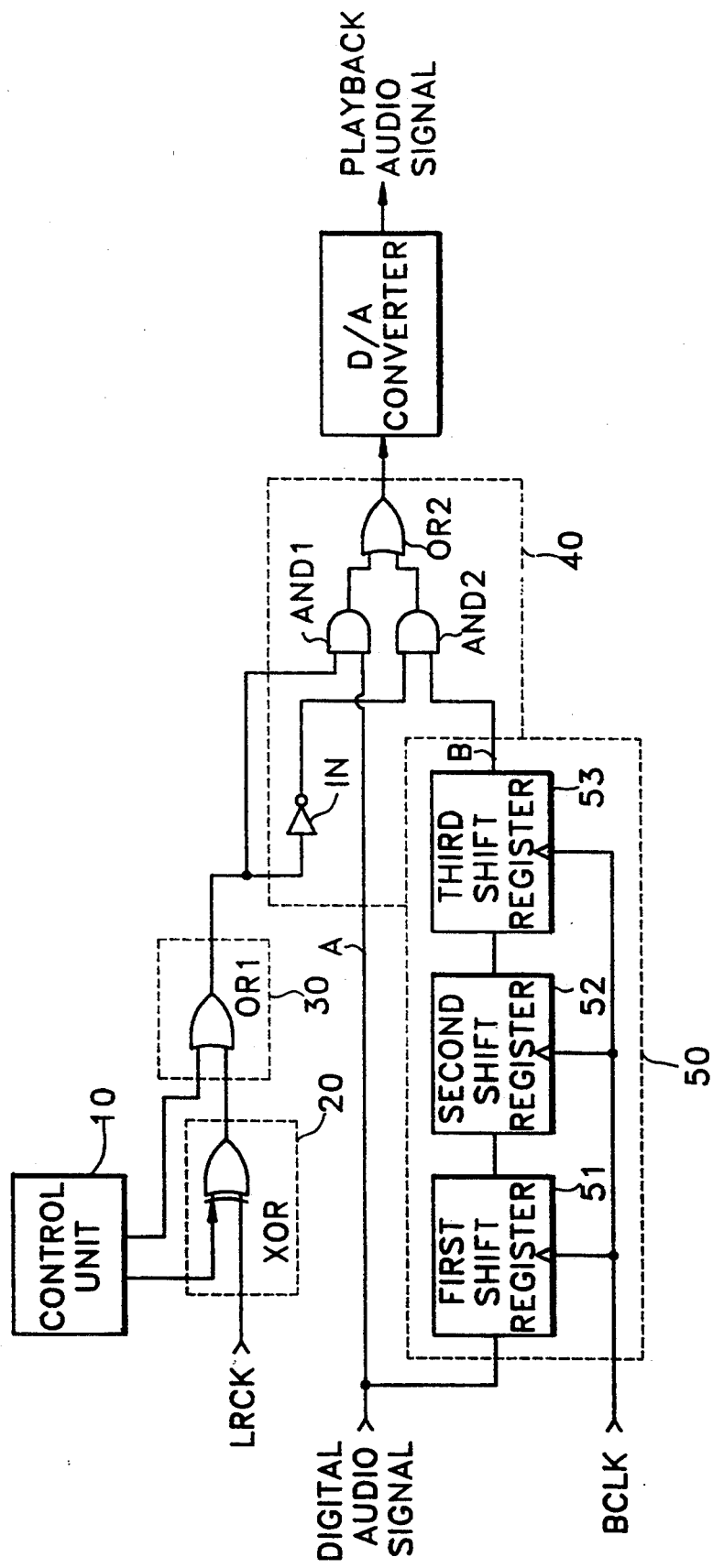
FIG. 3 is a circuit diagram of an embodiment of the circuit illustrated in FIG. 1 as a block diagram.

FIG. 1, which is a block diagram of a circuit for selectively setting a monaural channel according to the present invention, shows an embodiment of a digital video/audio signal processing system adopting an apparatus for processing audio signals.

FIG. 1 comprises a control unit 10 for outputting a channel selecting control signal and a stereo/monaural mode controlling signal according to user commands. FIG. 1 also shows a channel selecting signal generator 20 for receiving a clock signal (left/right clock, hereinafter referred to as LRCK) used in classifying the digital signal, which is output from a digital processing circuit (not shown) (which digitally processes the signals reproduced from recording media (not shown)) into left and right channels. The circuit 20 also receives the channel selecting control signal from control unit 10, and generates a channel signal desired to be reproduced in the mono mode. A playback mode setting unit 30 receives the output signals of channel selecting signal generator 20 and a stereo/monaural mode controlling signal of control, unit 10 and determines which will be used among a stereo mode and a monaural mode. A storage unit 50 receives a digital audio signal output from the digital signal processing circuit (not shown) and also receives a bit clock signal (hereinafter referred to as BCLK) demarcating each bit of the digital audio signal, the storage unit 50 being synchronous to the BCLK signal and temporarily storing the audio signal. A path control unit 40 having input terminals A and B which respectively receive an audio signal output from the unshown digital signal processing circuit and a signal output from the storage unit 50. The path control unit 40 is controlled by the signal output from playback mode setting unit 30 and selectively outputs the received signals A, B to a D/A converter 60 for reproduction as a playback audio signal.

FIGS. 2A-2C are timing diagrams showing the LRCK and BCLK signals used in FIG. 1 and the data format stored in a storage unit 50. FIG. 2A shows a LRCK signal, FIG. 2B shows a BCLK signal, and FIG. 2C shows the state of data stored in storage unit 50.

In FIG. 3, which shows an embodiment of the circuit shown in FIG. 1, channel selecting signal generator 20 is constituted by an exclusive OR gate XOR having one input terminal receiving the channel selecting control signal of control unit 10 and another input terminal receiving the LRCK signal, and playback mode setting unit 30 is constituted by a first OR gate OR1 having one input terminal receiving the stereo/monaural mode control signal of control unit 10 and the other input terminal receiving the output signal of generator 20, i.e., exclusive OR gate XOR.

As also shown in FIG. 3, storage unit 50 is constituted by a first shift register 51 (having, for example, an eight-bit capacity) which receives a digital audio signal, a second shift register 52 which receives the output signal of first shift register 51 and a third shift register 53 which receives the output signal of second shift register 52. These first, second and third shift registers 51-53 store the supplied signal which is synchronous to the BCLK signal, by shifting the signal one bit at a time, and therefore form a serial-in-serial-out register (SISO). Path control unit 40 is constituted by an inverter IN for inverting the output signal of first OR gate OR1, a first AND gate AND1 for receiving an output signal of first OR1 and a digital audio signal supplied via a signal path A, a second AND gate AND2 for receiving the output signal of third shift register 53 supplied via a signal path B and the output signal of inverter IN, and a second OR gate OR2 for receiving the output signals of first and second AND gates AND1 and AND2 as inputs and providing an output to D/A converter 60.

The operation of the circuit shown in FIG. 1 will now be explained with reference to FIGS. 2 and 3.

In the present embodiment, a digital audio signal is converted into an analog signal to be reproduced after one of the following three modes is selected: a mono left-channel selecting mode for outputting only the left channel signal, a mono right-channel selecting mode for outputting only the right channel signal, or a stereo mode for outputting both left and right channel signals. This embodiment is constructed for the purpose of preventing the sound quality from being lowered during monaural mode playback. The operation of the circuit will be explained with respect to the aforementioned three playback modes.

Control unit 10 outputs a stereo/monaural mode controlling signal and left/right channel selecting control signal to selectively set the desired playback mode among the above three playback modes in response to user commands. That is, the stereo/monaural mode controlling signal output from control unit 10 outputs a logic "high" when a stereo mode is selected by the control of a key input unit (not shown), while outputting a logic "low" when in a monaural mode. The left/right channel selecting control signal which is effective when a monaural mode is selected, outputs a logic "low" when the left channel is selected by the unshown key input unit, while outputting a logic "high" when the right channel is selected. Here, the aforementioned logic states can be changed according to design stipulations.

In a left channel selecting mode, in control unit 10, the stereo/monaural mode controlling signal outputs a logic "low," and the left/right channel selecting signal outputs a logic "low."

A channel selecting signal generator 20 which outputs a signal to select a channel desired to be reproduced by control unit 10 and LRCK signal, exclusive-OR operates the channel selecting control signal supplied from control unit 10 and the LRCK signal when constituted by exclusive OR gate XOR as shown in FIG. 3. When the channel selecting control signal supplied from control unit 10 is kept low, if the LRCK signal is supplied to exclusive OR gate XOR as shown in FIG. 2A, the exclusive OR gate outputs a logic "high" during a left-channel signal interval L-CH, and outputs a logic "low" during a right-channel signal interval R-CH, thereby simply outputting the supplied LRCK signal as is into playback mode setting unit 30.

Playback mode setting unit 30 which determines either stereo mode or monaural mode, selectively sets a playback mode by controlling the signal output from channel selecting signal generator 20 according to the stereo/monaural mode controlling signal supplied from control unit 10. Here, since the stereo/monaural mode control signal from control unit 10 is logic "low," the signal output from channel selecting signal generator 20 remains unchanged.

Meanwhile, the LRCK signal is supplied to channel selecting signal generator 20, and at the same time, a digital audio signal constituted by n-bit data per half period of the LRCK signal is supplied to path control unit 40 as shown in FIG. 2C. That is, when the LRCK signal occurs during left-channel signal generating term L-CH, n-bit data is supplied as shown in FIG. 2C, and when the LRCK signal occurs during right-channel signal generating term R-CH, the next group of n-bit data is supplied. The digital audio signal is supplied to path control unit 40 and simultaneously supplied to storage unit 50. The supplied audio signal is, synchronous with the BCLK signal, serially shifted one bit at a time, to be stored in storage unit 50. That is, when m pulses of the BCLK signal are supplied sequentially as shown in FIG. 2B, as each pulse is supplied, an n-bit audio signal (supplied as shown in FIG. 2C) is shifted one bit at a time into path control unit 40, to be temporarily stored. Here, the generating period of m pulses of the BCLK signal accords with the time during which a left (right) channel signal is supplied. In other words, if one period of the LRCK designates the period where all left/right channel signals are reproduced (i.e., a complete cycle of the square wave shown in FIG. 2A) and the generating period of m pulses of the BCLK signal is m, one period of the LRCK becomes 2m, and the playback term of only a left or a right channel signal becomes m. Here, the audio signal supplied as shown in FIG. 2C maintains the most significant bit (MSB), during generation of $m-(n-1)=(m-n+1)$ number of BCLK signals. From the moment when the $(m-n+2)$th BCLK signal is generated, the signal of the $(n-1)$th bit, the bit following the most significant bit, is supplied. For instance, if "m" equals 24 bits and "n" of FIG. 2C equals 16, the signal is shifted with the 16th bit, the MSB, as an input until the pulse of the BCLK signal is generated 9 times. Then, the signal is shifted one bit at a time from the 15th bit, starting at the moment when the 10th BCLK signal is generated. If employing 8-bit shift registers, storage unit 50 is constituted by shift registers 51, 52 and 53 as shown in FIG. 3 having a 24-bit capacity. Such a unit is adopted to each channel, and storage unit 50 can employ a 24-bit single chip construction.

Accordingly, if the digital audio signal supplied by the output signal of playback mode setting unit 30 corresponds to a left channel, path control unit 40 outputs the applied signal to D/A converter 60. Then, if the supplied digital audio signal corresponds to a right channel, path control unit 40 shuts off the digital audio signal on line A and controls the outputting of path B for the output signal of storage unit 50 to be output into D/A converter 60. Here, the output signal of storage unit 50 is a left channel signal, formed from a left channel signal simultaneously supplied to path control unit 40, synchronous to the BCLK signal, and shifted by a predetermined number of bits, so that the signal is the same as the previous left channel signal output to D/A converter 60. That is, while a left channel signal is input to path control unit 40 at terminal A, that same left channel signal is simultaneously input to storage unit 50. By the time the left channel signal input at terminal A has completely passed through the unit 40, that same left channel signal becomes completely stored in storage unit 50.

Path control unit 40 will be explained in detail with reference to the embodiment illustrated in FIG. 3.

Since the logic of the signal output from playback mode setting unit 30 is the same as that of the LRCK signal when the user selects the mono mode, if the digital audio signal is a left channel signal, the signal output from OR1 of circuit 30 into the input of AND1 of the path control unit 40 is logic "high," and if the digital audio signal is a right channel signal, the signal output from OR1 of circuit 30 into the input of AND1 of the path control unit 40 is logic "low." If the signal output from playback mode setting unit 30 is logic "high," logic "high" is supplied to one input terminal of a first AND gate AND1 in path control unit 40, and a logic "low" is supplied to one input terminal of a second AND gate AND2 via an inverter IN. Accordingly, the original digital signal on line A is output to second OR gate OR2. Since the signal output from second AND gate AND2 is logic "low," second OR gate OR2 transmits the output signal of first AND gate AND1 into D/A converter 60. Here, the output signal becomes a left channel signal as mentioned above.

While, if the signal output from playback mode setting unit 30 is logic "low," the signal supplied to one input terminal of first AND gate AND1 becomes logic "low," and the signal supplied to one input terminal of second AND gate AND2 becomes logic "high" after passing through inverter IN. Therefore, first AND gate AND1 outputs a logic "low" regardless of the logic of digital audio signal supplied to other input terminal. This effectively turns off the A line in FIG. 3. Second AND gate AND2 outputs the signal of storage unit 50 to second OR gate OR2. Since the output of first AND gate AND1 is logic "low," second OR gate OR2 outputs the signal of second AND gate AND2 to D/A converter 60. Here, the output signal becomes a left channel signal as mentioned above. Such an operation is repeated continuously unless the state of the signal selecting the aforementioned playback channel signal is changed, so that only the left channel signal is supplied to D/A converter 60. Thus, a mono mode for the left channel is achieved.

In the right channel selecting mode, the left/right channel selecting control signal output from control unit 10 outputs a logic "high," and the stereo/monaural mode controlling signal outputs a logic "low," as in the case of the aforementioned left channel signal.

Accordingly, channel selecting signal generator 20 inverts the supplied LRCK clock signal, to be output. That is, if constituted by exclusive OR gate XOR (FIG. 3), since the signal supplied from control unit 10 is logic "high" as mentioned above, channel selecting signal generator 20 outputs a logic "low" when the supplied LRCK signal is high, and outputs a logic "high" when the supplied LRCK signal is low.

As in the above case of selecting the left channel, since the mode control signal supplied from control unit 10 is low, playback mode setting unit 30 transmits the signal output from channel selecting signal generator 20.

In path control unit 40, if the supplied digital audio signal on line A is a left channel signal, the signal output from playback mode setting unit 30 is a logic "low," so that first AND gate AND1 outputs a logic "low" regardless of the logic of the supplied digital audio signal, and left channel signal is effectively shut off. Also, since a logic "high" is supplied from one input of second AND gate AND2 via inverter IN, second AND gate AND2 outputs to second OR gate OR2 the signal from storage unit 50 which stores right channel information by way of the same process as the aforementioned left channel selecting mode. Therefore, second OR gate OR2 outputs the output signal of second AND gate AND2 into D/A converter 60.

Meanwhile, if the supplied digital audio signal is a right channel signal, the signal output from playback mode setting unit 30 is high, so that a logic "high" is supplied to one input of first AND gate AND1 connected to the output of playback mode setting unit 30, but a logic "low" is at the same time supplied to one input of second AND gate AND2, also connected to the output of playback mode setting unit 30, due to the interconnection of inverter IN. Therefore, the signal output from first AND gate AND1 becomes an applied digital audio signal, and second AND gate AND2 receiving a logic "low" signal via one input, outputs logic "low" regardless of the signal output from storage unit 50, so that the signal output from storage unit 50 is effectively shut off. Accordingly, second OR gate OR2 outputs the signal from first AND gate AND1 to D/A converter 60.

When the user-selected playback mode is not monaural but a conventional stereo mode (i.e., the mode control signal output from control unit 10 is set to High), the channel selecting signal is output from control unit 10 as a "don't care" state, and the stereo/monaural mode controlling signal outputs a logic "high." With the control signal supplied from control unit 10 being high, playback mode setting unit 30 continuously outputs a logic "high" regardless of the logic of the signal output from channel selecting signal generator 20.

Further, since the logic "high" is continuously supplied to one input of first AND gate AND1 of path control unit 40 and the logic "low" is continuously supplied to one input of its second AND gate AND2, first AND gate AND1 outputs a received digital audio signal unchanged, and second AND gate AND2 which receives a logic "low" signal from playback mode setting unit 30, continuously outputs a logic "low" regardless of the logic of the signal output from storage unit 50. That is, the signal output from storage unit 50 is disabled. Accordingly, all audio signals of the two channels supplied from a digital signal processing circuit (not shown) are reproduced.

The present invention as described above provides a stereo audio apparatus of a digital video/audio signal processing system wherein a monaural mode is selectively set before a digitized audio signal is converted into an analog signal, and then the desired channel signal for monaural reproduction is selectively set, thereby preventing sound quality degeneration due to the analog switching of a conventional output terminal, and minimizing the electrical distance between D-to-A conversion and the output device and thus minimizing negative effects due to noise.

Having described a preferred embodiment of the present invention, it will be clear to those skilled in the art that modifications and alternatives to the disclosed apparatus exist within the scope and spirit of the present invention. Accordingly, it is intended to limit the scope of the present invention only as indicated in the following claims.

What is claimed is:

1. A circuit for selectively setting a monaural playback channel in a stereo audio apparatus, which digitally signal-processes audio signals of a plurality of channels reproduced from a recording media and converts, via a D/A converter, the audio signals into analog output signals, said circuit comprising:
   a channel selecting signal generator for generating a channel selecting signal to select a channel, from the plurality of channels, which corresponds to a signal desired to be reproduced among the audio signals of the plurality of channels;
   storage means for temporarily storing the audio signals of the plurality of channels, said storage means being synchronous to a predetermined clock signal;
   path controlling means for controlling the paths of (a) an audio signal supplied after being processed into a digital signal and (b) a signal output from said storage means, so as to transmit to the D/A converter the audio signals corresponding to the channels selectively set by said channel selecting signal generator; and
   control means for outputting to said channel selecting signal generator a control signal designating a desired channel to be reproduced in response to user commands, and controlling the generation of said channel selecting signal.

2. A circuit for selectively setting a monaural playback channel as claimed in claim 1, wherein said storage means comprises a shift register which shifts by one bit and stores a supplied digital audio signal.

3. A circuit for selectively setting a monaural playback channel as claimed in claim 2, wherein said shift register is an SISO register.

4. A circuit for selectively setting a monaural playback channel as claimed in claim 2, wherein said shift register comprises a plurality of shift registers which store the digital audio signal in synchronization with the predetermined clock signal, and wherein said predetermined clock signal is capable of differentiating said supplied digital audio signal by bits.

5. A circuit for selectively setting a monaural playback channel as claimed in claim 4, wherein said shift register stores digital audio signals of one channel unit.

6. A circuit for selectively setting a monaural playback channel as claimed in claim 1, wherein said channel selecting signal generator comprises a logic gate which receives the predetermined clock signal used in differentiating the plurality of channels and the channel selecting control signal of said control unit, and which performs an exclusive OR-operation thereon.

7. A circuit for selectively setting a monaural playback channel as claimed in claim 1, further comprising a playback mode selecting means which selects either a stereo mode or a monaural mode to reproduce the audio signal, said playback mode selecting means being controlled by said control means, and being operable for controlling said path controlling means.

8. A circuit for selectively setting a monaural playback channel as claimed in claim 7, wherein said playback mode selecting means controls said path controlling means independently of the channel selecting signal of said channel selecting signal generator when the stereo mode for said playback mode selecting means is selected via said control means.

9. A circuit for selectively setting a monaural playback channel as claimed in claim 7, wherein said playback mode selecting means comprises a logic gate which receives a stereo/monaural mode controlling signal from said control means and receives the selecting signal of said channel selecting signal generator, and which performs an OR-operation thereon.

10. A circuit for selectively setting a monaural playback channel as claimed in claim 7, wherein said path controlling means comprises a first AND gate for receiving an audio signal supplied in a stereo mode and an output signal of the playback mode selecting means, a second AND gate for receiving the output signal of the storage means and an inverted signal of the output signal of the playback mode selecting means, and a logic gate which receives respective output signals of said first and second AND gates, and which performs an OR-operation thereon.

11. A circuit for selectively setting a monaural playback channel as claimed in claim 10, wherein said path controlling means further comprises an inverter for inverting the output signal output from said playback mode selecting means before the output signal is supplied to said second AND gate.

12. A circuit for digitally transforming a stereo digital signal into a mono digital signal of a selected channel, comprising:
   gate means for receiving the stereo digital signal, for passing the stereo digital signal through to an output only during a first time period corresponding to the selected channel and for blocking the stereo digital signal during a second time period corresponding to another channel which is different from the selected channel; and
   storage means for receiving the stereo digital signal, for temporarily storing the stereo digital signal and for outputting a delayed stereo digital signal to said gate means L;
   said gate means further receiving the delayed stereo digital signal and outputting at least a portion of the delayed stereo digital signal during the second time period, to form the mono digital signal.

13. The circuit of claim 12 wherein the output of said gate means is connected to a D/A converter.

* * * * *